United States Patent [19]

Sato

[11] Patent Number: 4,869,546
[45] Date of Patent: Sep. 26, 1989

[54] COWL STRUCTURE FOR USE IN AN AUTOMOBILE BODY

[75] Inventor: Seiichi Sato, Hamamatsu, Japan

[73] Assignee: Suzuki Motor Company Limited, Japan

[21] Appl. No.: 191,609

[22] Filed: May 6, 1988

[30] Foreign Application Priority Data

May 8, 1987 [JP] Japan .................................. 62-68549

[51] Int. Cl.⁴ ............................................. B62D 25/08
[52] U.S. Cl. ................................... 296/192; 296/84.1
[58] Field of Search ................. 296/192, 194, 93, 84.1

[56] References Cited

U.S. PATENT DOCUMENTS 4,270,793  6/1981  Harasaki et al. .................... 296/192
4,718,713  1/1988  Sakamota et al. ................... 296/192
4,750,780  6/1988  Harasaki et al. .................... 296/192

FOREIGN PATENT DOCUMENTS 194665  11/1983  Japan .................................. 296/192
18574   1/1986   Japan .

Primary Examiner—Robert R. Song
Attorney, Agent, or Firm—McGlew & Tuttle

[57] ABSTRACT

A cowl structure for use in an automotive body of the type that a plurality of cowl panels are joined together to define a space with a closed box like cross section. In this cowl structure, a cowl top panel having a recess defined for receiving a window glass of an automobile is bent downwardly in a stepped manner at a widthwise middle portion on the rearward side thereof, while a cowl upper panel is bent upwardly in a like stepped manner at a widthwise middle portion on the forward side thereof in such a manner that the position of joint on the rear end portion of said both panels may be located at a lower level than that of said window glass receiving recess. Also, the cowl top panel and the cowl upper panel located in a confronted relationship with the both side lower ends of the window glass are joined together with a side body panel with three pieces of said panels being overlapped one upon another by way of a two-row spot-welding.

4 Claims, 4 Drawing Sheets

COWL STRUCTURE FOR USE IN AN AUTOMOBILE BODY

FIELD OF THE INVENTION AND RELATED ART STATEMENT

The present invention relates to an improvement in a cowl structure for use in an automotive vehicle. Such structures of a cowl assembly or section are generally adopted in the automotive industries as typically shown, for instance, in FIGS. 8 and 9. More specifically, there is shown provided in FIG. 8 a cowl assembly or section designated at 51, which is designed to form a closed box-like cross section or space extending along the width of an automotive body with the upper and lower extensions of a cowl top panel 52 and of a cowl upper panel 53 being spot-welded together, whereby there is attained a desired strength and rigidity of the cowl structure or section 51. Also, the arrangement defines a recessed framing or face 55 for receiving a front window shield or glass 54 of the vehicle, which is press-formed near the upper end of the cowl top panel 52.

It is also a common practice in the art as typically shown in FIG. 9 that the cowl top panel 52 and the cowl upper panel 53 have their portions in confronted relationship with the both lateral and lower sides of the front window glass 54 spot-welded together to an automotive side body panel 58 which is comprised of an outer panel 56 and an inner panel 57.

However, according to such a typical conventional contruction of cowl section, it was generally difficult in practice to have a desired accurate facing finish, because the recessed framing face 55 for receiving a window glass 54 would be of a welded surface with a rather areas of roughness and irregularities in the facing, or because the window glass 54 has to be mounted closely onto such a welded surface. Under such conditions, therefore, it was inevitable in mounting the window glass 54 in position that an excessive amount of adhesive or sealing agent had to be applied, or what is still worse, it was possible that there might occur leakage of rain water from a poor finish in water shielding.

On the other hand, since the jointed area of the cowl section 51 and the side body panel 58 is of a single-row spot-welding structure with as many as four sheets of the panels 52, 53, 56 and 57 being overlapped one upon another as typically seen in FIG. 9, the arrangement may possibly lead to poor welding work so that it might turn out to be a weak point in strength.

In this connection, reference is made to Japanese Patent Laid-Open Application No. 18574/1986, wherein there is disclosed an improvement in a cowl structure for use in an automotive vehicle which proposes a substantial rigidity in the cowl structure.

In consideration of such drawbacks particular to the conventional construction of a cowl structure for use in the automotive vehicle as noted above, it would be desirable to attain an efficent solution for overcoming such inevitable problems particularly with respect to the conventional construction.

OBJECT AND SUMMARY OF THE INVENTION

The present invention is essentially directed to the provision of a due and practical solution to such inconveniences and difficulties in practice as referred to above and experienced in the conventional cowl structure of an automotive vehicle which have been left unattended with any proper countermeasures therefor.

It is therefore a primary object of the present invention to provide an improvement in the construction of a cowl structure for use in an automotive vehicle whereby there may be attained an efficient effect in overcoming such undesired problems.

The above object of the invention can be attained as desired from an improved cowl structure for use in an automotive vehicle of the type that a plurality of component cowl panels are jointed together to form a closed box-like cross section or space extending in the direction of width of an automotive body, as summarized in brief, wherein the rear side of a cowl top panel, having a plane part defined for receiving a window glass, is bent downwardly in a stepped manner at a widthwise middle portion thereof, while the rear side of a cowl upper panel is bent upwardly in a like stepped manner at a widthwise middle portion thereof, in such a manner that the position of a joint on the rear end portion of both panels may be located at a lower level than that of the window glass receiving plane part, and wherein the cowl top panel and the cowl upper panel located in a confronting relationship with the both side lower ends of the window glass jointed together with a side body panel with three pieces of the component panel being overlapped one upon another by way of a two-row spot-welding.

By virtue of the provision of the rear end joint position of the cowl top panel and the cowl upper panel in the widthwise middle position of the vehicle's body located lower than the level to receive the lower end of a window glass, it is now possible in practice to have the window glass resting surface formed by a press forming operation, whereby an accurate facing finish may be effected assuredly. Also, there may be attained a substantial improvement in the workability and ease of construction of each of the component panels which construct the cowl section, thus making expectable a substantial reduction in production cost thereof.

In addition, by virtue of the provision of this advantageous cowl structure making it feasible in practice to have three pieces of the cowl top panel, the cowl upper panel and the wide of body panel welded together by way of two-row spot welding performed at the area where the cowl top panel and the cowl upper panel are placed in confronted relationship with the both lower lateral sides of the window glass, there is now attainable a subtantial increase in joint strength, thus contributing to an increased rigidity of the entire automotive body.

Additional features and advantages of the invention will now become more apparent to those skilled in the art upon consideration of the following detailed description of a preferred embodiment exemplifying a best mode of carrying out the invention as presently perceived. The detailed description refers particularly to the accompanying drawings, in which like parts are designated at like reference numerals.

BRIEF DESCRIPTION OF THE DRAWINGS

In the drawings, FIGS. 1 through 7 showing a preferred embodiment of an improved automotive cowl structure according to the invention, while FIGS. 8 and 9 showing a typical conventional cowl structure.

DETAILED DESCRIPTION OF PREFERRED EMBODIMENTS

Figure 1:
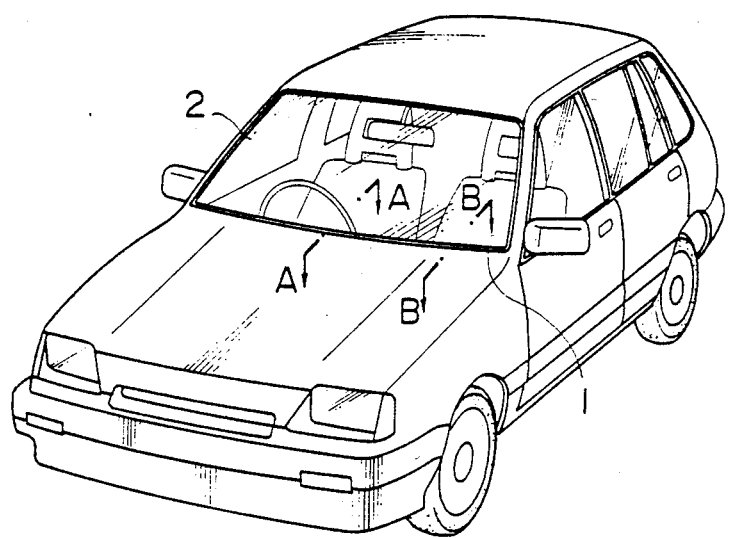
FIG. 1 is a general perspective view showing the general appearance of an automotive vehicle.

The present invention will now be explained in detail by way of a preferred embodiment thereof in conjunction with accompanying drawings herewith. Referring to FIGS. 1 through 7, there is shown by way of a preferred embodiment an improved automotive cowl structure for use in an automotive vehicle according to the invention. In the drawings, there is shown provided a cowl assembly or section designated at the reference numeral 1, which forms in streamed continuation the lower recessed area for a front window shield or glass 2, wherein this cowl section 1 is provided forming a closed box-like cross-section or space extending in the direction of width of the vehicle, and is designed to be jointed fixedly to a pair of side body panels (front pillar) placed on the front lateral sides of the vehicle. The cowl section 1 is comprised of a cowl to panel 4, a cowl upper panel 5, a cowl front panel 6 and a cowl side panel 7, all of which are welded together being overlapped one upon another by way of spot-welding.

The cowl section 1 noted above is advantageously designed with different profiles or cross-sections in the middle of widthwise extension and at the both lateral portions thereof. More specifically, one of the component panels, a middle cowl top panel 4 is, as typically shown in FIG. 4, formed to be a shape in cross-section having a forwardly sloped surface and a rearwardly sloped surface with its forward and rearward portions being bent downwardly in a stepped manner at a higher point than a resting or contact surface 8 where a window shield or glass 2 is mounted upon. Also, the rear end portion of this top panel 4 is secured upon the inverted-L shaped upper end portion of a vertical extension 5a of an upper panel 5, while the front end portion thereof is fixed in position to the upper end portion of a front panel 6. Consequently with this arrangement, a jointed portion 9 of the top panel 4 and the upper panel 5 at the widthwise middle portion thereof is located in position at a lower level rearwardly of a resting contact surface 8 for receiving the window glass 2.

The lower end portion of the above mentioned front panel 6 is fixed upon the front end portion of a horizontal extension 5b of the upper panel 5, while the front end portion of the horizontal extension 5b of the upper panel 5 is fixed in position upon the upper end portion of a dash panel 10, respectively.

Figure 2:
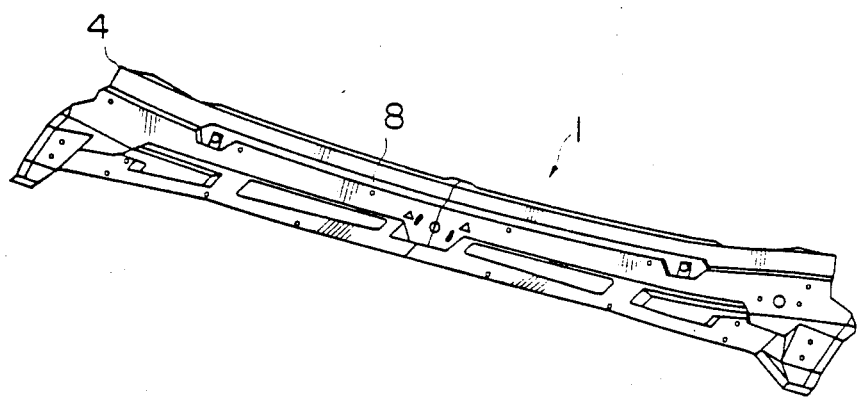
FIG. 2 is a perspective view showing generally a cowl top panel.
Figure 5:
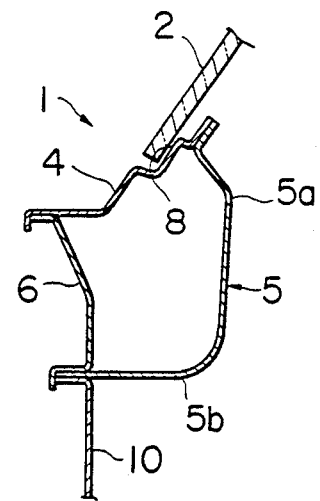
FIG. 5 is a cross-sectional view taken along the plane B—B in FIGS. 1 and 3.

On the other hand, the cowl top panel 4 has its both sides formed in a shape which corresponds to the attitude of inclination of the window glass 2 as typically shown in FIG. 5. The cowl top panel 4 has its upper end portion located slightly higher than the glass contact surface 8 fixed rigidly upon the upper end portion of a vertical extension 5a of the upper panel 5. The cowl top panel 4 extends higher than at the same in the middle portion thereof. With this arrangement, the jointed position of the panels 4 and 5 on the both lateral sides is located at a higher level than the resting contact surface 8 for the window glass 2, thereby to prevent rain water from entering thereinto. All other portions of the panel are designed with like cross-sectional shapes as the widthwise middle portion thereof. At the same time, the glass resting contact surface 8 defined in the cowl top panel 4 is formed in a stepped shape in cross-section, whereby the window glass 2 may positively be adhered in position. In addition, the jointed portion 9 of the top panel 4 and the upper panel 5 extend in continuation in a gradually upward inclination from the middle portion to the both sides thereof, as seen in FIGS. 2 and 3.

Figure 3:
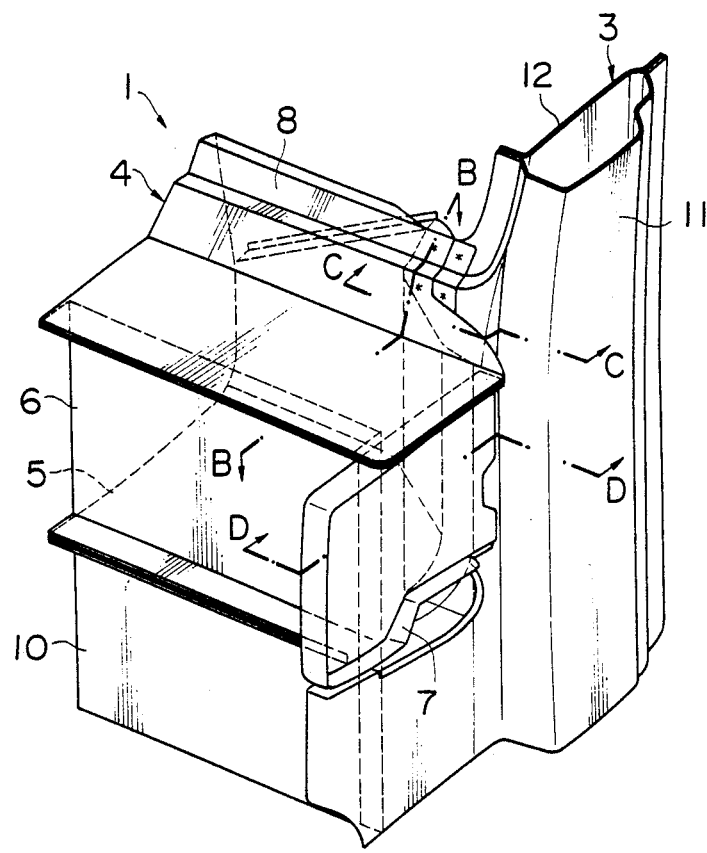
FIG. 3 is a perspective view showing the lateral side of a cowl section.
Figure 4:
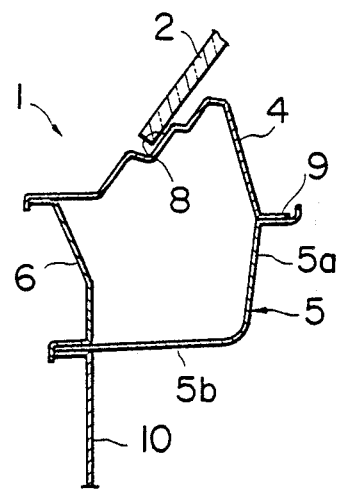
FIG. 4 is a cross-sectional view taken along the plane A—A in FIG. 1.
Figure 6:
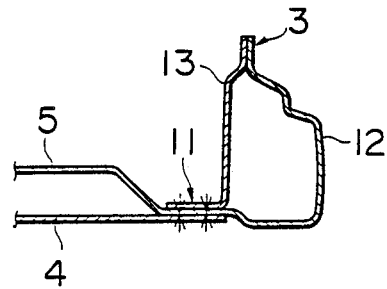
FIG. 6 is a cross-sectional view taken along the plane C—C in FIG. 3.

Incidentally, the side portion 11 where the cowl section 1 and the side body panel 3 meet with the lower end side of the window glass 2 is, as shown in FIGS. 3 and 6, of a two-row spot-weld structure by way of three sheets of these components. More specifically, the side body panel 3 is formed in a closed box-like cross section or space with both end portions of the outer panel 12 and the inner panel 13 being welded together, and with the edge portion of the outer panel 12 and the edge portion of the cowl upper panel 5 being put in a coplanar sandwiched relationship with the cowl top panel 4 and the inner panel 13 one upon another. With such arrangement, the top panel 4 is jointed firmly upon the upper panel 5 and outer panel 12, and the inner panel 13 upon the upper panel 5 and the outer panel 12, respectively.

Figure 7:
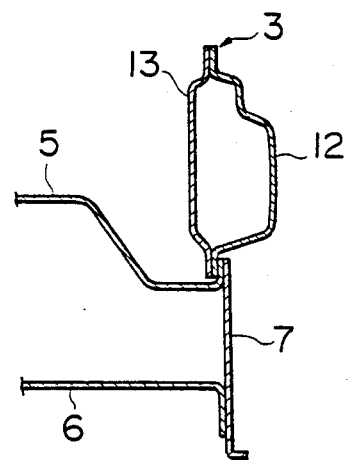
FIG. 7 is a similar cross-sectional view taken along the plane D—D in FIG. 3.
Figure 8:
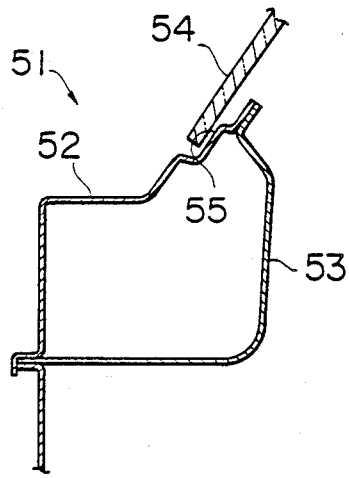
FIG. 8 is a cross-sectional view which corresponds to FIG. 4.
Figure 9:
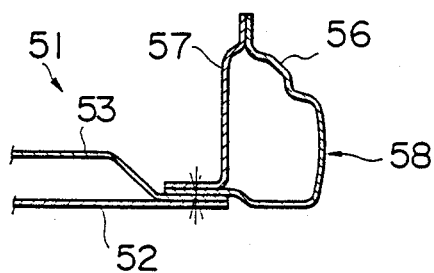
FIG. 9 is a similar cross-sectional view corresponding to FIG. 6.

Also, as shown in FIGS. 3 and 7, in the lower part of the above noted side portion 11, the side edge of the upper panel 5 is jointed to the outside of the forward jointed area of the side body panel 3, and upon the further outer side of this joint the rear end portion of the cowl side panel 7 is mounted securely. Upon the front end portion of the cowl side panel 7, the side edge of the cowl front panel 6 is secured in position.

According to such arrangement of the automotive cowl structure of the present invention, it is now possible in practice to have the contact surface 8 receiving the window glass 2 press-formed integrally in the widthwise middle portion of the cowl top panel 4, and accordingly, there is attainable a smooth facing with a desired accuracy. In addition to this advantage, by virtue of the provision of the advantageous arrangement such that the joint 9 between the cowl top panel 4 and the cowl upper panel 5 may be located at a lower level on the side of the upper panel 5, there is attainable a substantial improvement in the workability and in the formability of the upper panel 5. Also, with such an advantageous construction that the jointed side portion 11 between the both lateral portions of the cowl section 1 and the side body panel 3 is of a two-row spot weld structure formed with three pieces of such component panels being overlapped one upon another, there is again attainable a substantial improvement in the joint strength and in the quality of spot-welding, accordingly.

While the invention is described herein by way of a specific embodiment thereof, it is to be understood that the invention may be put into reduction in various ways without being restricted to this specific embodiment thereof, but many other alterations and modifications may be made without departing from the spirit and scope of the invention.

For instance, while there is provided a cowl assembly or section 1 having a closed box-like cross section or space as being defined with the cowl top panel 4, the cowl upper panel 5, the cowl front panel 6 and the cowl side panel 7, it is of course feasible in practice to provide such a closed cross section or space defined together with the cowl top panel 4, the cowl upper panel 5 and the cowl side panel 7, accordingly.

It is also to be understood that the appended claims are intended to cover all of such generic and specific features particular to the invention as disclosed herein and all statements relating to the scope of the invention, which as a matter of language might be said to fall thereunder.

What is claimed is:

1. An automotive body cowl structure, comprising: a cowl top panel; and a cowl upper panel, said cowl top panel and said cowl upper panel being jointed together to define a space with a closed box-like cross-section extending in the direction of width of an automotive body, said cowl top panel having a planar contact surface for window glass and a rise-up portion extending upwardly from said contact surface, said cowl top panel having a bent portion between said rise-up portion and said contact surface defining a gap between said rise-up portion and the window glass, said cowl top portion having a rearward part extending downwardly, said cowl upper portion having a rearward part extending upwardly, said top cowl portion and said upper cowl portion each having a joint surface which cooperate to form a jointed portion, said jointed portion lying at least partially below said contact surface.

2. An automotive body cowl structure according to claim 1, wherein said cowl top panel and said cowl upper panel each have end parts adjacent lower ends of the window glass, said end parts being jointed to side body panels, each side body panel being formed of an inner panel and an outer panel, an end edge of said side body, said side body outer panel and an end part of the upper panel abutting each other along a plane, said end part of said cowl top panel and said side body inner panel overlapping said abutting side body outer panel and end portion of said upper panel to form a layered structure, said layered structured being jointed together by two-row spot welds, for three-sheet jointing.

3. An automotive body cowl structure according to claim 1, further comprising a cowl front panel connected to said cowl upper panel and connected to said cowl top panel.

4. An automotive body cowl structure comprising: a cowl top panel; a cowl upper panel; a right-body panel and a left-body panel, said cowl top panel and said cowl upper panel being jointed to said cowl right- and left body panels, said cowl top panel and said cowl upper panel being jointed to define a space with a closed box-like cross section extending in the direction of width of an automotive body, said cowl top panel having a substantially planar contact surface for receiving window glass and having a rise-up portion extending upwardly from said contact surface, said cowl top panel having a bent portion between said rise-up portion and said contact surface defining a gap between said rise-up portion and the window glass, said cowl top portion having a rearward part extending downwardly, said cowl upper portion having a rearward part extending upwardly, said top cowl portion and said upper cowl portion each having a joint surface which cooperate to form a jointed portion, said jointed portion lying at least partially downwardly of said contact surface.

* * * * *